United States Patent [19] | [11] 4,231,693
Kammeraad | [45] Nov. 4, 1980

[54] REAMER WITH RADIAL RELIEF

[75] Inventor: James A. Kammeraad, Holland, Mich.

[73] Assignee: K-Line Industries, Inc., Holland, Mich.

[21] Appl. No.: 16,014

[22] Filed: Feb. 28, 1979

[51] Int. Cl.[3] .......................... B23B 51/00; B23P 6/00; B23B 35/00

[52] U.S. Cl. .................................... 408/230; 408/1 R; 29/401.1

[58] Field of Search ....................... 407/1, 54; 408/197, 408/201, 219, 220, 221, 225, 227, 229, 230, 1 R

[56] References Cited

U.S. PATENT DOCUMENTS

| | | | |
|---|---|---|---|
| 224,921 | 2/1880 | Kenworth . | |
| 595,346 | 12/1897 | Saake | 408/229 |
| 846,666 | 3/1907 | Hanson | 408/229 |
| 1,355,065 | 10/1920 | Simpson . | |
| 1,826,323 | 10/1931 | Mueller . | |
| 1,988,770 | 1/1935 | Alexander . | |
| 2,342,143 | 2/1944 | Howe . | |
| 2,940,342 | 6/1960 | Lavallee . | |
| 3,245,099 | 4/1966 | Zagar . | |
| 3,548,476 | 12/1970 | Cave et al. | 407/54 |
| 3,759,625 | 9/1973 | Iversen . | |
| 3,824,027 | 7/1974 | Janci | 408/225 |
| 3,828,415 | 8/1974 | Kammeraad | 29/401 |
| 4,103,662 | 8/1978 | Kammeraad . | |

OTHER PUBLICATIONS

Machinery's Handbook, pp. 1306–1321, 1956 edition.

*Primary Examiner*—Harrison L. Hinson
*Attorney, Agent, or Firm*—Price, Heneveld, Huizenga & Cooper

[57] ABSTRACT

A finish reamer adapted to finish ream a phosphor bronze valve guide insert is disclosed. The reamer includes a body section having a plurality of spiral flutes formed therein. The flutes define a plurality of cutting blades. Each cutting blade has an axially extending radial relief formed therein.

28 Claims, 4 Drawing Figures

20 22 24 26 31 30 III 32 10 $d_3$ 16 18 $d_2$ $d_1$ 28 $d_4$ III 12 14

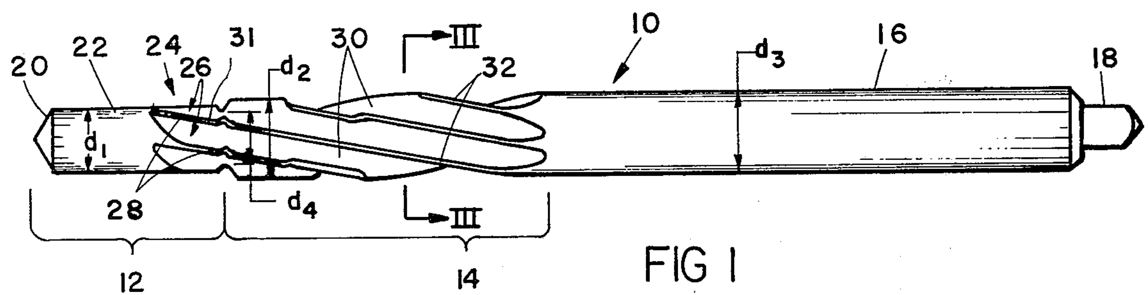
FIG 1
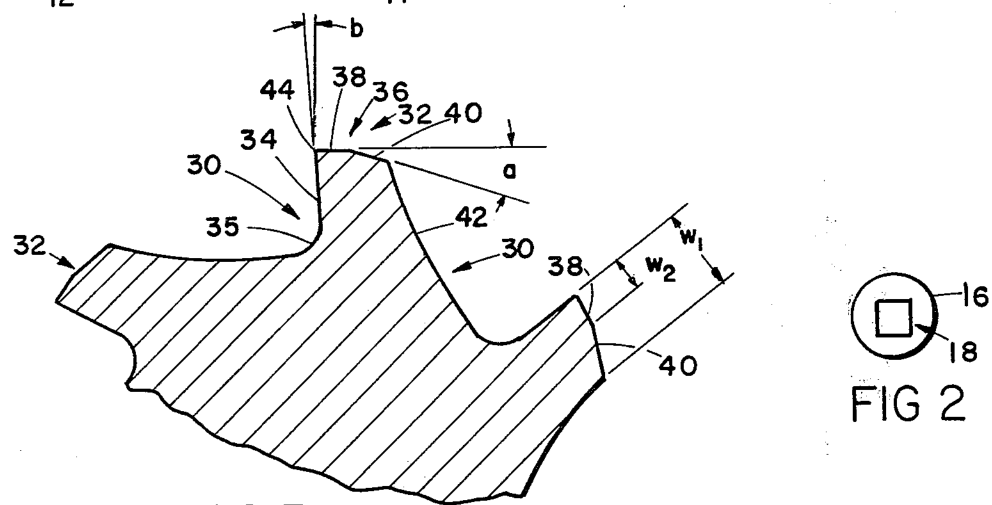
FIG 3
FIG 2
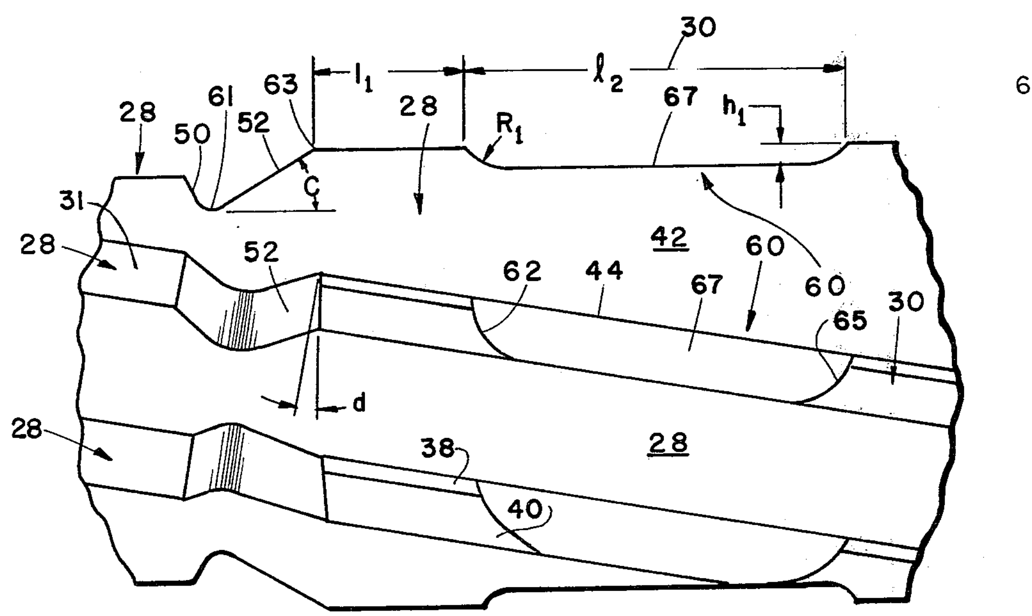
FIG 4

REAMER WITH RADIAL RELIEF

BACKGROUND OF THE INVENTION

The present invention relates to cutting tools and more particularly to finish reamers.

In a wide variety of manufacturing and repair or reconditioning processes, it is necessary to accurately cut a hole or bore to a predetermined inner diameter. For example, such a cutting operation is performed in some of the various methods which have heretofore been developed for rebuilding of internal combustion engine valve guides. After extensive use, the valve guides of an internal combustion engine will wear presenting excessive clearance between the valve guide and the valve stem. This excessive clearance may have an adverse effect on valve train operation and also increases undesirable emissions from the internal combustion engine.

The various methods heretofore proposed have included lining or relining of the worn valve guides with generally cylindrical inserts. In a typical rebuilding process, a worn valve guide is bored out to receive the insert which is press fit or forced into the bored out valve guide passageway. The insert is finish reamed so that the internal diameter is accurately cut and dimensioned with respect to the stem of the valve which reciprocates within the rebuilt valve guide.

Inserts of various materials, such as cast iron, thin wall, silicon bronze-aluminum and phosphor bronze, have been employed in such rebuilding methods. Cast iron inserts present certain inherent problems primarily related to cost, rate of wear and heat transfer characteristics. In order to overcome these problems, different forms of bronze, and particularly phosphor bronze, inserts have been developed. The phosphor bronze material is harder than cast iron and silicon bronze-aluminum. Phosphor bronze inserts provide increased wear characteristics and heat transfer properties. Examples of phosphor bronze inserts may be found in U.S. Pat. No. 3,828,415 entitled METHOD AND APPARATUS FOR REBUILDING VALVE GUIDES and issued on Aug. 13, 1974, to James A. Kammeraad and Donald J. Kammeraad and U.S. Pat. No. 4,103,662 entitled INSERT FOR REBUILDING VALVE GUIDES and issued on Aug. 1, 1978, to James A. Kammeraad.

One of the inserts disclosed in U.S. Pat. No. 3,828,415 is a thin wall tubular member stamped from a blank of phosphor bronze and progressively formed into a tubular shape leaving a longitudinal slit. The insert is forced into a reamed valve guide by means of an adapter. The outer diameter of the insert is greater than the reamed valve guide so that the insert is radially compressed when it is forced into the reamed valve guide. The insert is then trimmed so that it is flush with the valve guide. The inner surface of the insert may then be knurled to flow the metal and seal off the passage through the slit. Finally, the valve guide is finish reamed to a predetermined diameter as required for the particular size of valve stem. The tubular insert has a wall thickness in the range of 10 to 25 thousandths of an inch and is preferably in the range of 15 to 20 thousandths of an inch.

An insert as disclosed in U.S. Pat. No. 4,103,662 includes an inner sleeve or tube of spring-tempered phosphor bronze and an outer carrier sleeve or tube of steel or aluminum. The separate formation of the inner and outer sleeves allows precise control of wall thicknesses, diameters and concentricities.

With each type of valve insert disclosed in the aforementioned patents, the finish reaming step is typically, although not always, performed with a high speed reamer. Reamers are fabricated in a plurality of graduated, standard diameter sizes to accommodate the different sizes of valve guides. The reamers each include a plurality of flutes which define cutting blades. The flutes may be straight or spiral cut. Typically, a spiral flute reamer is used since it provides a better finish and a smoother cutting of the insert passageway than a straight cut reamer.

Conventional reamer blades each include a rake face, a cutting edge, a land having a margin and a relief, and a trailing portion. The land may be circular or convex and is typically relieved to avoid interference and rubbing with the work piece. Such reamers may be manufactured from high speed steel and a fluting cutter is employed to cut the flutes into the reamer blank. Further, the reamer portion may be back tapered to prevent binding of the reamer within the bore which is being enlarged and finished. An example of a prior reamer may be found in U.S. Pat. No. 2,940,342 entitled REAMERS and issued on June 14, 1969, to Lavallee.

The heretofore available finish reamers employed to finish the passageways of phosphor bronze valve inserts have suffered from various problems primarily related to wearability. The prior reamers after five or six reaming operations are no longer able to hold their size. Use of the tool for additional reaming operations results in unacceptable dimensioning and finishing of the phosphor bronze valve guide insert.

SUMMARY OF THE INVENTION

A need exits for an improved finish reamer providing increased tool life, increased ease of cutting and which will hold the hole size longer than the reamers heretofore available and which is adapted to cut hard materials such as phosphor bronze. Essentially, the finish reamer in accordance with the present invention includes a body section having formed therein a plurality of flutes with each flute defining a cutting blade. Each blade includes a rake face, a cutting edge and a radially outer clearance face or margin. The margin along a portion thereof is formed with a radial relief opening through the rake face and dimensioned so as not to contact the work piece during reamer operation.

It is believed that the primary cause of the poor tool life heretofore experienced when finish reaming hard materials such as phosphor bronze has been the heat generated in the reamer and in the insert during the reaming operation. It is further believed that the reamer in accordance with the present invention possesses significantly increased tool life due to better heat dissipation which is the result of formation of a radial relief in the cutting blades.

BRIEF DESCRIPTION OF THE DRAWINGS

FIG. 1 is a side elevational view of a finish reamer in accordance with the present invention;

FIG. 2 is a right end elevational view of the reamer of FIG. 1;

FIG. 3 is a fragmentary, sectional view taken generally along line III—III of FIG. 1; and FIG. 4 is a greatly enlarged pictorial view of a portion of the reamer of FIG. 1.

DETAILED DESCRIPTION OF THE PREFERRED EMBODIMENT

A finish reamer in accordance with the present invention is illustrated in FIG. 1 and generally designated 10. The finish reamer 10 includes an elongated member having a pilot section 12, a finish reamer or body section 14 and a cylindrical shank section 16. The cylindrical shank section terminates in a conventional tang 18. The tang 18 is chucked into a suitable power tool in a conventional fashion.

The pilot section 12 includes a conical or chamfered leading end 20, a cylindrical portion 22 and a fluted portion 24. Portion 24 includes a plurality of flutes 26. Flutes 26 are formed in the reamer blank in a conventional fashion employing a fluting cutter which removes material from the blank. Each of the flutes 26 defines a cutting blade 28.

The finish reamer or body section 14 similarly includes a plurality of flutes 30. Flutes 30 are a continuation of flutes 26 formed in pilot section 12 of the tool. Flutes 30 define finish reamer section cutting blades 32. In the preferred embodiment, six flutes are formed in the tool 10 and they assume a righthand helix or spiral angle of ten (10) degrees with respect to the longitudinal centerline of the tool.

Blades 28 of the pilot section 12 are tapered. Blades 28 and the cylindrical portion 22 pilot or align the tool 10 within the bore which is being finished. Each cutting blade 28 includes a land 31 which is a full circular land and has no relief. As seen in FIG. 3, each of the blades 32 of the reaming or body section 14 includes a rounded leading edge 35, a rake face 34, a land 36 which includes a margin 38 and a heel 40, and a trailing surface 42. Heel 40 of each land 36 is angled relative to a line extending tangentially from the margin 38 at a relief angle designated a (FIG. 3). In the preferred embodiment, the relief angle a is approximately ten (10) degrees. Rake face 34 is angled from the vertical, as seen in FIG. 3, at a rake angle designated b. In the preferred embodiment, rake angle b is approximately two (2) degrees. The intersection between the rake face 34 and the margin 38 defines a cutting edge 44. Rake face 34 and margin 36 of the finish reamer section 14 are formed in a conventional fashion by conventional processes.

As best seen in FIG. 4, each blade 28 terminates in an angled surface 50. The leading edge of finish reamer section 14 is defined by a chamfer 52 cut into each blade 30. In the preferred embodiment, chamfer 52 has a chamfer angle designated c in FIG. 4 of approximatel thirty (30) degrees. Further, as seen in FIG. 4, each chamfer 52 is ground with a chamfer relief angle relative to a line perpendicular to the longitudinal centerline of the tool and generally designated d of approximately twelve (12) degrees.

It is presently preferred that the cylindrical portion 22 of the pilot section have a constant diameter designated $d_1$ in FIG. 1. Tool 10 tapers to a point of maximum diameter from the beginning or leading edge of the blades 28 in the pilot section to a point spaced rearwardly from the chamfers 52 on the finish reaming section 14. The point of maximum diameter is designated $d_2$ in FIG. 1. The maximum diameter $d_2$ is the finish diameter of the bore to be reamed. The finish reamer section 14 has a back taper from the point of maximum diameter to the shank 16. The shank 16 is formed with a constant diameter designated $d_3$ in FIG. 1. Each land 36 has an overall width designated $W_1$ and each circular margin portion 38 has a width designated $W_2$ in FIG. 3. Further, the diameter between opposed leading edges 61 of chamfers 52 is designated $d_4$ in FIG. 1.

In accordance with the present invention, each of the cutting blades 32 of the reamer section 14 has ground therein an axially extending, radial relief 60. Each radial relief 60 extends transversely across the entire width of land 36 and opens through rake face 34. Each radial relief is spaced a distance $l_1$ from a trailing edge 63 of chamfer 52. Further, each radial relief 60 has a length $l_2$, rounded leading and trailing ends or edges having a radius $R_1$ and a flat section or portion 67. Each relief 60 has a depth or height designated $h_1$ in FIG. 4. Reliefs 60 have a length along the blade which is greater than the width of the land. Radial reliefs 60 are ground into the lands 36 of the cutting blades 32 at points spaced rearwardly from the point of maximum diameter of the tool and the trailing edge of chamfer 52. Further, the depth or height $h_1$ of each relief is such that the tool in the area of the relief does not engage the work surface.

The length dimension of each relief 60 and the positioning on the cutting blade is such that a terminal edge 65 is located rearwardly of the point of maximum diameter $d_2$ along the back taper of the tool. The cutting blades continue rearwardly of the radial relief. The positioning of the relief prevents the occurrence of a secondary spiral being cut in the work piece. The portions of each cutting blade rearwardly of the radial relief assist in piloting the tool and improve the surface finish. If terminal edge 65 were not along the back taper, another cutting edge would be formed giving unacceptable results. The cutting blade portions rearwardly of the radial reliefs are necessary for a good finish when the tool is used to ream the rather long valve insert bores.

It is believed that the relief significantly increases heat dissipation and significantly reduces the heat generated during operation of the tool. Increased heat dissipation increases the efficiency and ease of finish cutting of the bore and cutting pressures are reduced. Also, the tool in accordance with the present invention has exhibited a significant increase in tool life. For example, a prior reamer used to finish phosphor bronze valve inserts provided acceptable finishing for only five or six reaming operations. In contrast, a tool in accordance with the present invention has been employed to finish ream phosphor bronze valve guide inserts for two hundred reaming operations. The present invention, therefore, has permitted a significant decrease in the cost of performing finish reaming operations due primarily to increased tool life and a corresponding decrease in the cost of valve guide rebuilding.

The prior approach to achieving increased tool life has generally been to increase the width $W_2$ of margin portion 38. This approach has been used particularly with tools designed to ream cast iron. In stark contrast, the tool in accordance with the present invention includes a relief angle which would be considered radical and a reduced margin width than heretofore considered normal practice. The rake angle a, the dimensions $W_2$ and $W_1$, the positioning and dimensioning of the radial reliefs 60, co-act to increase heat dissipation and eliminate hole dimension changes due to expansion of the tool and the work piece during operation from the heat generated. The cutting blade portions rearwardly of the radial reliefs are able to accurately align and surface finish since the change in tool and work piece dimensions due to heat are effectively stopped. The reduced margin width reduces friction thereby reducing heat generation and heating of the tool and the work piece. The problems heretofore experienced, it is believed, were primarily caused by the length of the bore of the insert and the length of the ream. Given the length of the ream the degree of accuracy of prior tools could not be maintained for an acceptable number of operations.

Reamers in accordance with the present invention are fabricated in a plurality of graduated diameter sizes to finish ream the various sizes of valve guide inserts presently available. Presently existing embodiments of the finish reamer have a pilot section 12 with an overall longitudinal dimension of 1.00 inch, a finish reamer section 14 with an overall longitudinal dimension of 1.87 inches and an overall length of approximately 7.00 inches. The conical portion or surface 20 of pilot section 12 is chamfered or beveled at an angle of thirty (30) degrees from vertical.

Cylindrical portion 22 in such presently existing embodiments has a diameter $d_1$ of approximately 0.295 inches, dimension $d_4$ is approximately 0.248 inches and the maximum diameter $d_2$ of the finish reamer portion is approximately 0.310 inches. This maximum diameter occurs a point spaced ⅛ of an inch from a trailing edge 63 of chamfer surface 52. It is preferred that theback taper runs towards shank portion 16 the full axial length of cutting blades 32. The preferred back taper is equal to 0.0008 inches per inch. The leading edge 62 of each radial relief 60 is positioned at a distance $l_1$ of approximately 0.375 inches along the cutting blade 32. The overall length $l_2$ of the radial relief is approximately 0.5 inches and the depth or height $h_1$ is approximately 0.007 inches. The radius $R_1$ is approximately 0.060 inches and the diameter $d_3$ of the shank portion 16 is approximately 0.305 inches. The overall circular land width $W_1$ of each cutting blade is approximately 0.040 inches and the width $W_2$ of the margin 38 is within the range of 0.011 to 0.016 inches. In other words, the width of the margin is within the range of 27.5 percent to 40 percent of the overall width of the land. The ratio of the length $l_2$ of the relief along the cutting blade to the longitudinal dimension of the body portion or reamer section 14 is approximately 0.267. The ratio of the depth of the radial relief 60 to the overall length $l_2$ of the radial relief is approximately 0.014. The distance $l_2$ is approximately 75 percent of the length dimension of the radial relief along the blade. It is presently preferred that the tool 10 be fabricated from a high speed steel and heat treated to an RC-63 minimum hardness. Further, it is preferred that the shank be polished after heat treating to insure that there are no burrs or sharp edges on the shank. Other materials, such as carbon steel or carbide, could be used.

In the method of rebuilding a valve guide employing the tool in accordance with the present invention, tubular bronze inserts of the type illustrated in the aforementioned U.S. patents are positioned within a bored valve guide. The reamer 10 is then chucked to a suitable power tool, positioned within the tubular insert and rotated to finish ream the insert to the predetermined inner diameter. To the extent necessary, the disclosures of the aforementioned U.S. Pat. Nos. 3,828,415 and 4,103,662 are hereby incorporated by reference.

In view of the foregoing description, it should be readily apparent to those of ordinary skill in the art that the unique finish reamer in accordance with the present invention possesses significant advantages when compared to the prior high speed finish reamers. The reamer in accordance with the present invention significantly increased tool life, an increase in ease of use, possesses the ability to hold the proper hole size longer and results in significantly reduced costs than have heretofore been obtainable.

Various modifications could undoubtedly be made to the reamer illustrated which would not depart from the inventive concepts disclosed herein. For example, it is believed that the land 36 could be a smoothly convex surface and the specificshape of the radial relief 60 could be varied from that illustrated while still obtaining the improved results of the present invention. The primary consideration with the formation of the radial relief 60, it is believed, is that it be dimensioned so as to not contact the bore or work surface during reamer operation. Further, while it is preferred that the tool 10 include pilot section 12 to insure concentricity with the bore, the finish reaming 14. The pilot section 24 could be dispensed with without departing from the inventive concepts disclosed herein. It is expressly intended, therefore, that the above description should be considered as that of the preferred embodiment. The true spirit and scope of the present invention may be determined by reference to the appended claims.

The embodiments of the invention in which anexclusive property or privilege is claimed are defined as follows:

1. A finish reamer adapted to finish ream a hard material, said reamer comprising:

a member having a back tapered body section, said body section having a plurality of flutes, said flutes defining a plurality of cutting blades, each cutting blade having an axially extending radial relief formed therein for dissipating heat during reamer operation, said relief extending along a portion only of said cutting blade and each of said cutting blades including a pilot and surface finish portion rearwardly of each of said radial reliefs.

2. A finish reamer as defined by claim 1 wherein each of said cutting blades includes a cutting edge and a land, said radial relief extending transversely across the entire width of said land.

3. A finish reamer as defined by claim 2 wherein said radial relief includes smoothly curved forward and rearward ends and a generally flat central portion.

4. A finish reamer as defined by claim 3 wherein said land of each of said cutting blades includes a margin and a heel, said heel positioned at an angle of relief relative to said margin.

5. A finish reamer as defined by claim 3 wherein said cutting blades each have a rake angle of approximately 2 degrees.

6. A finish reamer as defined by claim 5 wherein each of said lands includes a narrow margin having an edge in common with said cutting edge and a heel, said heel being orientated at a relief angle to said margin.

7. A finish reamer is defined by claim 6 wherein the width of said margin is within the range of 27.5 percent to 40 percent of the overall width of said land.

8. A finish reamer adapted to finish ream a hard material, said reamer comprising:

a member having a body section, said body section having a plurality of flutes, said flutes defining a plurality of cutting blades, each cutting blade having an axially extending radial relief formed therein for dissipating heat during reamer operation, said relief extending along a portion only of said cutting blade, each of said cutting blades including a cutting edge and a land, said radial relief extending transversely across the entire width of said land, said radial relief including smoothly curved forward and rearward ends, said cutting blades each having a rake angle of approximately 2 degrees, each of said lands including a narrow margin having an edge in common with said cutting edge and a heel, said heel being orientated at a relief angle to said margin, the width of said margin being within the range of 27.5 percent to 40 percent of the overall width of said land, and said reamer including a pilot section, said pilot section including a cylindrical portion and a fluted tapered portion.

9. A finish reamer as defined by claim 8 wherein said finish reamer member body section is back tapered to prevent binding during use and said radial reliefs terminate along said cutting blades rearwardly of the point of maximum diameter of said body section.

10. A finish reamer as defined by claim 9 wherein the ratio of the length of said radial relief along said cutting blade to the longitudinal dimension of said body portion is approximately 0.267.

11. A finish reamer as defined by claim 10 wherein said fluted tapered portion of said pilot section is separated from said body section by a chamfer.

12. A finish reamer as defined by claim 11 wherein said chamfer has a chamfer angle of approximately 30 degrees and a chamfer relief angle of approximately 12 degrees.

13. A finish reamer as defined by claim 12 wherein said flutes of said tapered portion of said pilot section define cutting blades, each blade of said pilot section having a full circular land.

14. A finish reamer for finishing a bore, said reamer comprising:

a body section having a back tapered portion and having formed therein a plurality of spiral flutes, said flutes defining a plurality of cutting blades each having a rake face, a cutting edge, and a land, said land including a radial relief extending along the land a distance greater than the width of said land and terminating within the back tapered portion of the body section, said relief opening transversely through the rake face of said blade, each of said cutting blades including a pilot and surface finish portion rearwardly of each of said radial reliefs.

15. A finish reamer for finishing a bore, said reamer comprising:

a back tapered body section having formed therein a plurality of spiral flutes, said flutes defining a plurality of cutting blades each having a rake face, a cutting edge, and a land, said land including a radial relief extending along the land a distance greater than the width of said land, said relief opening transversely through the rake face of said blade and said radial relief including smoothly rounded leading and trailing edges and a generally flat central section, said flat section being below the land a predetermined depth, each of said cutting blades including a pilot and surface finish portion rearwardly of each of said radial reliefs.

16. A finish reamer as defined by claim 15 wherein said body section has a maximum diameter forward of said radial relief.

17. A finish reamer as defined by claim 16 wherein said reamer further includes a pilot section separated from said body section by a chamfer and a shank section joined to said body section.

18. A finish reamer as defined by claim 17 wherein said pilot section includes flutes defining cutting blades which are a continuation of the flutes of said body section.

19. A finish reamer as defined by claim 18 wherein the cutting blades of said body section each include a land having a margin and a heel, said heel having a surface angled at a relief angle with respect to said margin.

20. A finish reamer as defined by claim 19 wherein the cutting blades of said pilot section each include a full circular non-reliefed land.

21. A finish reamer as defined by claim 20 wherein said body section includes at least six flutes, said rake face of each blade of said body section having a rake angle of approximately 2 degrees, said relief angle being approximately 10 degrees and each of said chamfers has a chamfer relief angle of approximately 12 degrees.

22. A finish reamer as defined by claim 21 wherein said radial relief of each of said blades has a length along said blade which is approximately 26.7 percent of the overall longitudinal length of said body section, and said blades extend the full longitudinal length of said body section.

23. A finish reamer as defined by claim 22 wherein said cutting blade includes a portion between said chamfer and said radial relief having a length dimension of approximately 75 percent of the length dimension of said radial relief.

24. A finish reamer as defined by claim 23 wherein the ratio of the depth of said radial relief to the length of said radial relief is approximately 0.014.

25. A method of rebuilding valve guides comprising the steps of:

positioning a tubular hard material insert within a valve guide;

providing a finish reamer having a back tapered, fluted body section, said body section defining spiral cutting blades each having a leading edge, a rake face, a land, a trailing surface and a cutting edge, each of said cutting blades further defining a radial relief opening along the cutting edge and through the rake face and beginning at a point spaced from the leading edge of said blade and wherein each of said cutting blades further includes a pilot and surface finish portion rearwardly of each of said radial reliefs;

positioning said finish reamer within said tubular insert; and rotating said finish reamer to finish ream said insert to a predetermined inner diameter.

26. The method as defined by claim 25 wherein said finish reamer further includes a pilot section forward of said back tapered fluted body section, said sections being separated by a chamfer and said insert is fabricated from phosphor bronze.

27. The method as defined by claim 25 wherein said radial relief defined by each of said blades have a length along the cutting blade greater than the width of said land.

28. The method as defined by claim 27 wherein the length of said radial relief is approximately 26.7 percent of the overall length of said body section.

* * * * *

UNITED STATES PATENT AND TRADEMARK OFFICE

CERTIFICATE OF CORRECTION

PATENT NO. : 4,231,693

DATED : November 4, 1980

INVENTOR(S) : James A. Kammeraad

It is certified that error appears in the above—identified patent and that said Letters Patent is hereby corrected as shown below:

Column 3, line 50:

"approximatel" should be --approximately--;

Column 5, line 5:

"primarly" should be --primarily--;

Column 5, line 26:

"theback" should be --the back--;

Column 5, line 42:

After "the" (first occurrence), insert --radial--;

Column 6, line 2:

After "invention", insert --possesses--;

Column 6, line 11:

"specificshape" should be --specific shape--;

Column 6, line 19:

After "reaming", insert --operation is performed at the body or finish reamer section--;

UNITED STATES PATENT AND TRADEMARK OFFICE

CERTIFICATE OF CORRECTION

PATENT NO. : 4,231,693

DATED : November 4, 1980

INVENTOR(S) : James A. Kammeraad

It is certified that error appears in the above—identified patent and that said Letters Patent is hereby corrected as shown below:

Column 6, lines 26-27:

"anexclusive" should be --an exclusive--.

Signed and Sealed this

*Twenty-third* Day of *June 1981*

[SEAL]

*Attest:*

RENE D. TEGTMEYER

*Attesting Officer* *Acting Commissioner of Patents and Trademarks*